3,332,074
INPUT SIGNAL SENSING APPARATUS
Wayne E. Arnold, Murrysville, Pa., assignor to Westinghouse Electric Corporation, East Pittsburgh, Pa., a corporation of Pennsylvania
Filed Dec. 31, 1963, Ser. No. 334,841
6 Claims. (Cl. 340—174)

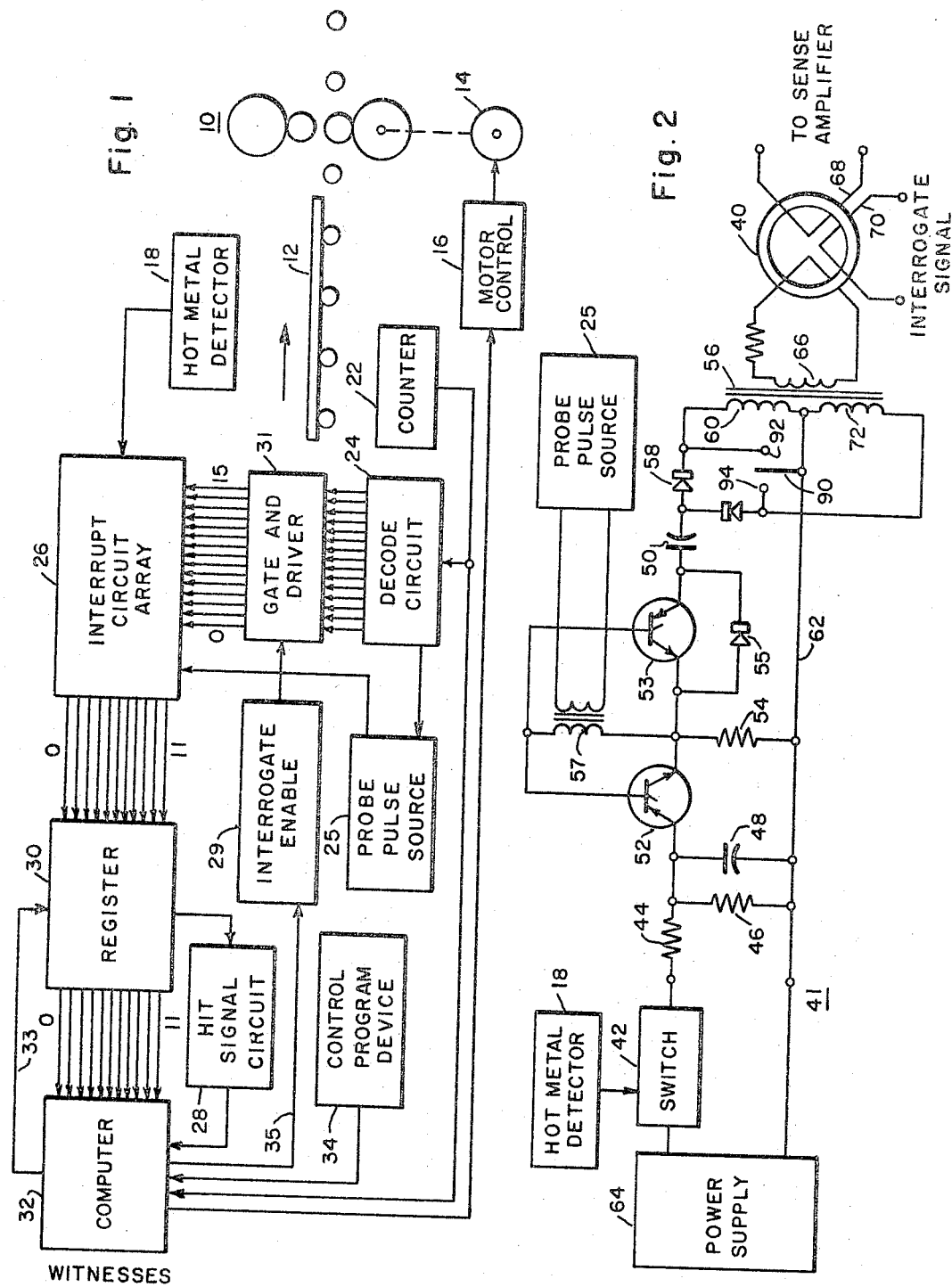

This invention relates in general to input signal sensing apparatus, and more particularly to input signal sensing apparatus capable of interrupting the initially programmed operation of a computer upon the occurrence of some external event indicated by the provision of an input signal for which it is desired that the otherwise and normally programmed computer operation should be interrupted.

For example, when a computer is coupled to control a machine device, such as a steel rolling mill or the like, the programmed operation of the computer at any given time might be to determine the rolling speed for the next pass through a particular stand of the rolling mill for a succeeding workpiece. The occurrence of an output signal from a workpiece sensing hot metal detector, to signify the presence of a preceding workpiece about to enter that same particular stand of the rolling mill, should be effective to interrupt this next pass rolling speed calculation by the computer and instead cause the computer to control the motor speed relative to this preceding workpiece and in accordance with a previously calculated motor speed for that particular stand, such that the speed of the rolls thereof will be appropriate for the entrance of this preceding workpiece.

It is already known in the prior art to employ in general transistor switching circuits to interrupt the programmed operation of a computer. The latter prior art circuits have not provided adequate rejection of noise signals and have not adequately isolated the computer from undesired disturbances that could result in malfunctions of the computer itself and the operation that is controlled by the computer. In addition, serious damage to other coupled peripheral circuitry and devices has resulted from the use of transistor switching circuitry for this purpose due to the lack of adequate isolation therefor.

It is an object of the present invention to provide an improved input signal interrupting circuit and operation for a computer such that the desired isolation is presented between the computer and peripheral controlling devices and in addition better transfer is effected for input signals from those peripheral devices for the interruption of the computer as first indicated by the closure of a controlling contact device or some provided input signal indicative of a process operation or the like and then is secondly indicated by the subsequent opening of that same contact device or the removal of said provided input signal, which input signal can be in the order of a few milliseconds up to substantially continuous in duration.

It is an additional object to provide improved operation interrupting circuit means that is less expensive and better operative with a computer to permit only one interruption for each appropriate interrupt input signal and to better effect the interruption of the computer by calling the attention of the computer to the need for an interrupt by the respective input signals and then representing to the computer program that the device in question has reverted back to its initial or normal condition.

It is a further object of the present invention to provide a better sensing of input signal information that a peripheral device has called for the interrupt of the computer until and then better sensing that this information has been transferred into the computer to effect the desired interruption thereof.

These and other objects of the present invention are accomplished by an input signal sensing circuit operative with a computer or the like and including a first storage capacitor circuit which is charged upon the closing of an input signal contact device and then the occurrence of a probe pulse effects the charging of a second storage capacitor circuit to signify a suitable interrupt input signal which is operative to set a square loop memory core than can be sensed by a coupled sense winding. Upon the provision of an interrogate pulse, the computer is informed of the particular interrupt input signal and the flux in the square loop memory core is driven back to positive saturation to provide a pulse for this purpose into the provided sense winding. Until the input signal contact device opens, any additional probe pulse will not cause additional changes in the setting of the square loop core. When the input signal contact device opens, a discharge of the second storage capacitor circuit occurs to again set the square loop core to signify the satisfaction of the desired computer interrupt. Thus, the computer is informed of both the closing of the process or input signal contact device and the subsequent opening of the contact device.

The various features of the present invention will better be understood with reference to the accompanying drawings wherein:

FIGURE 1 is a diagrammatic and general showing of well known computer interruption control apparatus such as could be operative with the input signal sensing circuit of the present invention;

FIGURE 2 is a schematic showing of the computer interruption input signal sensing circuit of the present invention.

Figure 3:
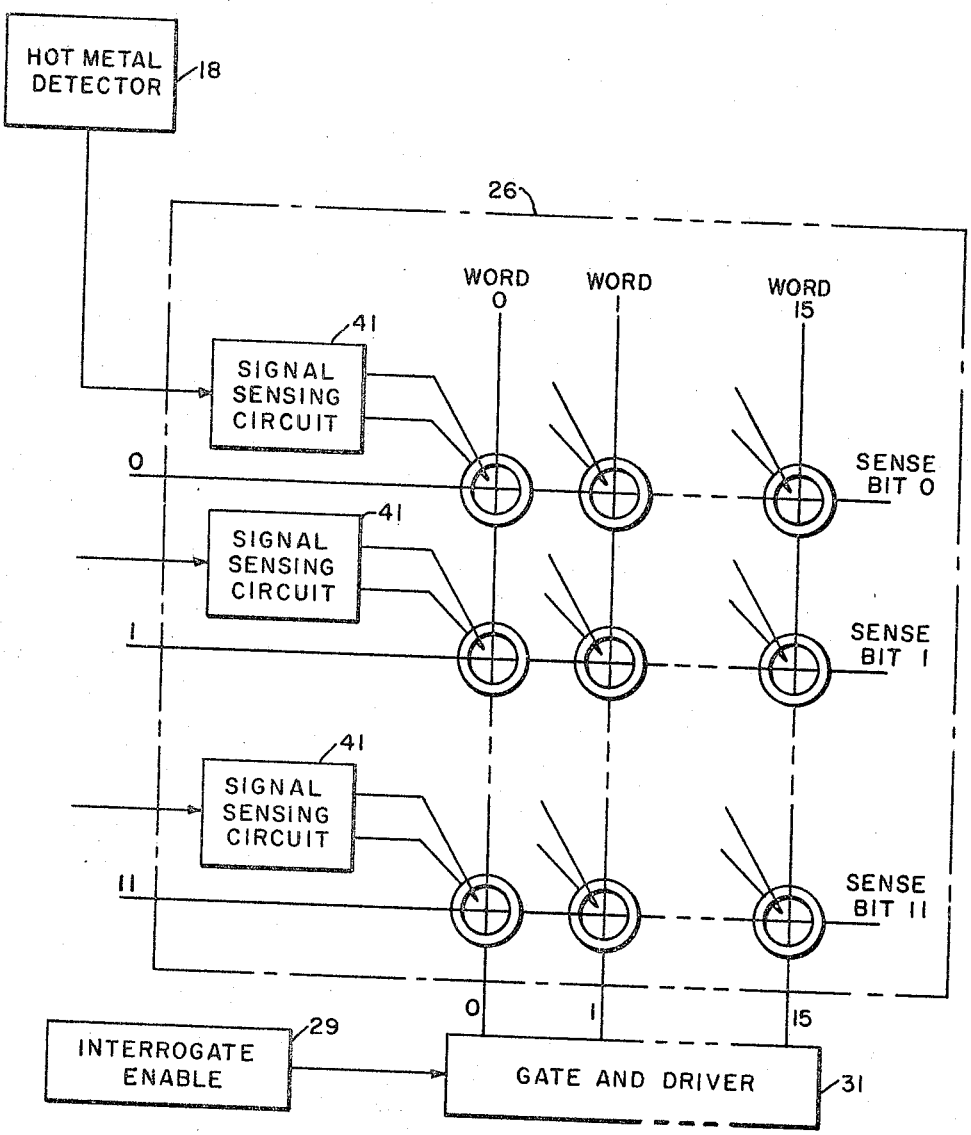
FIGURE 3 is a diagrammatic showing of an interrupt input signal sensing circuit array operative to interrupt the computer operation.

In FIGURE 1 there is shown a rolling mill stand 10 operative with a workpiece 12 traveling as indicated in a direction toward the rolling mill stand 10. A motor 14 is operative to drive the rolls of the mill stand 10 as determined by a well known and conventional motor control 16. A hot metal detector 18 is operative to sense the arrival of each workpiece and to provide a computer interrupt input signal to the interrupt circuit array 26. A counter 22, which is free running and operative to count through 0 to 15 in binary form in approximately ½ millisecond, provides output signals to a decode circuit 24, which receives the binary output signals from the counter 22 and decodes this information into sixteen interrogate signals that are successively fed to the interrupt circuit array 26. The sixteen signals from the decode circuit 24 are operative to energize the respective signal sensing circuits in the provided interrupt circuit array 26, which is arranged with sixteen word columns of signal sensing circuits and twelve rows of such circuits, such that the columns correspond to the words and the rows correspond to the word bits. In this way, particular word bit signal sensing circuits of the interrupt circuit array 26 are energized to change the respective operative status of associated square loop memory cores to indicate the application of the interrupted input signals. One such input signal is supplied to a signal sensing circuit from the hot metal detector 18 as shown in FIGURE 3 in word column zero and bit row zero and others can be from a plurality of other and similar interrupt signal sources.

The respective interrupt signals from the interrupt circuit array 26 shown in FIGURE 1 are supplied to the interrupt input data register 30 which includes 12 bistable flip-flop circuits, each being provided to signal an interrupt operation to the computer. The interrupt input data register is connected with the computer 32 normally operative with a control program device 34, to interrupt its operation by an interrupt signal from the input data register 30 for the purpose of performing some desired function, such as controlling the motor 14 as will be later described.

When an interrupt signal is present in the interrupt input data register 30, a hit signal circuit 28 is energized to notify the computer 32 that an interrupt signal is present and to be sensed. The computer 32 now reads the signal level of the counter 22 to identify the word priority of the interrupt signal stored in the interrupt input data register 30, and sends a signal through conductor 35 to remove the enable signal supplied by the interrogate enable circuit 29 to thereby block the gate and driver circuit 31. If the priority of the previous and currently programmed operation of the computer 32 is lower than that of the now available interrupt input signal to be sensed and present in the interrupt input data register 30, the computer 32 will respond to this interrupt input signal and then send a signal through a connection 33 to clear the interrupt input data register 30. The computer again allows the interrogate enable circuit 29 to open the gate and driver circuit 31 after the counter 22 has returned to its zero and highest priority word count level. Thusly, if the above interrupt input signal was stored in the interrupt circuit array 26 in the one word column of circuits, the counter 22 would return the interrogate operation to the highest priority or zero word column of circuits after the computer had processed the one or more interrupt signals stored in the input data register in the event that a higher priority interrupt signal was present and available in the interrupt circuit array 26.

In FIGURE 2, there is shown an interrupt input signal sensing circuit 41 such as provided in the interrupt circuit array 26 and operative with a square loop core 40 and pulse transformer 56 which provides the desired computer input signal isolation and interrupt signal memory function required of the circuit shown in FIGURE 2. The square loop core 40 is within the interrupt circuit array 26 as shown in FIGURE 3 and has two stable states of operation which are respectively negative saturation and positive saturation operation as is well known. As shown in FIGURE 2, an interrupt input signal is applied when an external device such as the hot metal detector 18 senses a hot workpiece or other interrupted condition and causes switch 42 to close and thereby apply an interrupt input signal to the voltage divider circuit including resistor 44 and resistor 46. Prior to this time, the capacitors 48 and 50 were not charged. The capacitor 48 now charges to a voltage level determined by the resistors 44 and 46 when the latter interrupt signal is so applied. The probe pulse source 25 periodically provides a probe pulse once every one-half millisecond at the time between the 15 and 0 count level of the counter 22, when none of the interrupt circuits in the array 26 are being interrogated. When this probe pulse is next applied to the control gate electrode of the controlled rectifier 52, that rectifier will turn on to become conductive and cause current to flow in two parallel paths, one being through the resistor 54 and the other path being through the diode 55, the capacitor 50, the diode 58, and the primary winding 60 of transformer 56, to the negative conductor 62 connected to the power supply 64. The capacitor 48 is initially charged to a voltage in the order of 30 volts in a period of about 1.5 milliseconds as determined by the charging circuit arrangement including the resistors 44 and 46 and the 48 volts of the D.C. power supply 64. When the capacitor 50 is so charged, due to the rectifier 52 becoming conductive, the current flow through the primary winding 60 will then stop but the controlled rectifier 52 will continue to conduct current through resistor 54. The pulse of current provided through the primary winding 60 while the capacitor 50 was charging resulted in an output signal from the secondary winding 66 to set the square loop core 40 in a different state of saturation, for example positive saturation. This change in the operative state of the square loop core 40 can be sensed by the sense winding in the interrupt circuit array 26 and the corresponding flip-flop circuit in the register 30 to cause the hit signal circuit 28 to signify to the computer 32 the occurrence of a hit signal or interrupt input signal.

The computer 32 now causes a read or interrogate pulse to be applied to the interrogate windings of all the memory cores, such as shown in FIGURE 2 as the interrogate winding 70 of the square loop core 40, to cause the flux in the core 40 to be driven back to the opposite state of saturation and result in another output pulse being induced to set the core 40 to indicate through the sense winding 68 to the register 30 and the computer 32 the particular square loop core that responded to the interrupt input signal.

For each additional probe pulse from the probe pulse source at this time no current will pass through the primary winding 60 and the closing of the contact switch 42 will be ignored until this contact switch 42 is opened. When contact switch 42 opens, this causes the capacitor 48 to discharge through the resistor 46. When the voltage across the capacitor 48 becomes low enough, the controlled rectifier 52 will no longer be conductive to remove the back bias voltage applied to the controlled rectifier 53. The next probe pulse applied to the probe pulse transformer 57 will now cause the controlled rectifier 53 to become conductive, to discharge the capacitor 50 through the primary winding 72 to set the square loop core 40 again to positive saturation and signify to the computer through the sense winding 68 the opening of the contact switch operative with the same word and bit within the interrupt circuit array.

When the first probe pulse is applied to the rectifier 52 to set the core 40, the attendant flux change gives a usable output signal through the sense winding 68 which can be applied through an OR logic circuit to a common flip-flop provided within the register 30 for indicating that at least one input interrupt signal is present within the interrupt circuit array 26. The interrogate signal applied to the winding 70 changes the flux within the core 40 to transfer this interrupt information to an associated flip-flop within the register 30 as previously described. Now the opening of the contact switch 42, discharges the capacitor 48 such that the next probe pulse applied to the transformer 57 causes the rectifier 53 to become conductive and discharge the capacitor 50 through the primary winding 72 to again change the flux within the core 40 to supply through the sense winding 68 to this common OR logic circuit and provided flip-flop the information that the contact switch 42 is open and the next interrogate pulse again resets the core 40 to determine which input signal contact switch opened. The program of the computer 32 remembers that the output pulse provided by the interrogate operation relates to a closing or an opening of the particular contact switch.

The above described sequence of operations will again be repeated for the next closing of the contact switch 42. The capacitor 48 charges each time the contact switch 42 closes. The probe pulse source 25 periodically provides a probe pulse to the probe pulse transformer winding 57 at a time between the 15 and 0 count level of counter 22, when none of the interrupt input circuits are being interrogated, to cause a probe pulse to fire and make conductive the controlled rectifier 52 shown in FIGURE 2. The capacitor 50 now charges through a path including the conductive controlled rectifier 52, the diode 55, the capacitor 50 and the primary winding 60 of the output pulse transformer 56. Thus the circuit shown in FIGURE 2 will sense a closing of the contact switch 42 by changing the operative state of the core 40. When the interrogate signal is supplied to the interrogate winding 70, the flux state of the core 40 again changes to provide an output signal to the sense winding 68. The capacitor 50 discharges through the pulse transformer 56 when the controlled rectifier 53 becomes conductive. The capacitor 48 remains charged for a time period long enough to not respond to undesired bounces of the contacts within the input signal contact switch 42.

Thusly, the input signal sensing circuit shown in FIGURE 2, will sense the occurrence of a given interrupt input signal for both the closing of the contact switch 42 and then the subsequent opening thereof. The program of the associated computer will interpret the thereby provided first interrupt output signal from the sense winding 68 to indicate a closure of the contact switch 42 in accordance with some external controlled device or process step requesting the attention of the computer. The second interrupt output signal thereby provided from the sense winding 68 will indicate to the program of the computer that the controlled device or process step has satisfactorily reverted back to its previous and normal condition.

FIGURE 3 illustrates how a plurality of the input signal sensing circuits 41, such as shown in FIGURE 2, are connected to provide a matrix with each being operative at a predetermined and assigned priority level to determine an interruption of the otherwise programmed operation of the computer. In the example shown in FIGURE 3, the bit zero and word zero square loop core could be the highest priority interrupt core in the interrupt circuit array 26, with the next order of priority being the bit one and word zero core, and so forth to the lowest priority level or word fifteen and bit eleven square loop core.

The resistors 44 and 46 and the capacitor 48 shown in FIGURE 2 provide a filtering of applied input signals in addition to their other functions. The filter time constant is chosen to be sufficient to prevent most noise spikes from causing an undesired interrupt operation relative to the computer. The pulse transformer 56 and the associated square loop core for each word and bit are inherently insensitive to noise because of the current required for switching.

Multiple input signals such as could be caused by relay contact bounce are found to be no problem, when used for interrupt input signals. If the contact switch 42 comprised a relay contact that bounces open again and again, the time constant with which capacitor 48 discharges has been made sufficiently long that it retains enough voltage to prevent the firing of the controlled rectifier 53 when the contact of switch 42 bounces to close again.

The interrupt circuit array 26 shown in FIGURE 1 includes a two dimensional matrix arrangement of input signal sensing circuits as shown in FIGURE 3. The columns are the words, and the corresponding bits of each word are in series such that all bits of each word are interrogated at one time. The rows are the bits. After all of the input signal sensing circuits are simultaneously probed by the probe pulse source 25 shown in FIGURE 1 to charge the capacitor 50 shown in FIGURE 2 for the respective input signal sensing circuits 41 where there have been input signal contact closures, the word bits are interrogated one at a time in their level of priority into the input data register 30 as shown in FIGURE 1. Any input signal sensing circuit that has been set by an interrupt input signal will have an output signal from its output pulse transformer when the word column containing it is interrogated. This pulse transformer output signal sets the associated square loop core in the interrupt circuit array 26 to cause an interrupt in the operation of the computer 32 and to prevent any further interrogation of the cores until the interrupt register 30 is read into the computer through an input channel. Provision is made for the probe pulse source 25 to continue operating during this process of taking an interrupt signal into the computer. If more than one signal sensing circuit in a word has been so set before the word has been interrogated, all the set bits of that word will be taken into the interrupt input register 30 and the computer in parallel at the same time.

In reference to FIGURE 3, an interrogate enable signal is supplied to the gate and driver circuits 31 to enable the decoded counter signals to interrogate the windings of the respective word bit columns of the circuit array 26 as shown in FIGURE 3. Any of the twelve bit square loop cores in a given word column storing an input interrupt signal will be switched thereby to its opposite state of operation by the interrogate pulse to result in an output signal being supplied through its sense winding as shown in FIGURE 2. By using the square loop cores, in the event of a power failure the square loop cores will retain their interrupt signal changed operating states to function as memory devices in this regard if required.

Thusly, it will be seen that the interrupt control circuit as seen in FIGURE 2 is operative to isolate the computer as provided by the pulse transformer 56 and the controlled rectifiers 52 and 53. The capacitor 50 is operative to allow only one interrupt regardless of the length of time that the contact switch 42 is closed. A probe pulse from the probe pulse source 25 synchronizes the time in which the signal sensing circuit can be set to thereby prevent interference with the interrogating of the other signal sensing circuits. Any given signal sensing circuit shown in FIGURE 3 is operative to store the information that a peripheral device has called for an interrupt of the computer until this information is transferred into the interrupt input register 30 shown in FIGURE 1. The interrupt input signal sensing circuit is able to receive the next successive interrupt input signal after the capacitors 48 and 50 have been discharged from the previous interrupt input signal. The input filter and inherent noise rejecting properties of the circuit are sufficient to prevent noise signals from causing undesired interrupts of the computer.

It should be understood that the computer 32 shown in FIGURE 1 includes its own priority director to determine if a normally programmed operation of the computer should continue when any given interrupt signal is received. If a higher priority interrupt input signal is received, the programmed computer operation will be interrupted. However, if the currently programmed operation of the computer has a higher priority than the particular interrupter input signal, the computer 32 will continue its current programmed operation until a lower priority programmed operation of the computer 32 is reached such that the now higher priority interrupt input signal will interrupt the computer operation.

It should be understood that the hot metal detector 18 shown in FIGURE 1 is operative with only the signal sensing circuit of a particular bit of a particular word in the interrupt circuit array 26, and is described for purpose of example. Other interrupt signals, such as to indicate a circuit breaker tripping to show an overload condition or the like, will be similarly provided to other interrupt circuits of the array and be of perhaps higher or lower priority as may be desired.

Although the present invention has been described with a certain degree of particularity, it should be understood that the present disclosure has been made only by way of example and that numerous changes in the details of construction and the combinaiton and arrangement of parts may be resorted to without departing from the scope and spirit of the present invention. For example in FIGURE 2 there is shown a manual switch 90 having three operative positions. In a first position in contact with a terminal 92, the signal sensing circuit will respond only to the opening of the contact switch 42. In a second position in contact with terminal 94, the signal sensing circuit will respond only to the closing of the contact switch 42. And in the third position shown in FIGURE 2, the signal sensing circuit will respond to both the closing and opening of the contact switch 42 as previously described.

I claim as my invention:

1. Apparatus for providing a plurality of output signals in response to the occurrence of an input signal and as determined by the provision of a first control signal followed by a second control signal, including signal storage means responsive to said input signal to be charged by said input signal and to be discharged when said input signal is no longer provided, first circuit control means coupled to said signal storage means to provide a first output signal after the occurrence of said input signal and while said signal storage means is charged and in response to the first control signal, and second circuit control means coupled to said signal storage means and responsive to said first output signal to provide another output signal after the input signal is no longer provided and in response to the second control signal.

2. Apparatus for providing one output signal in response to the occurrence of an input signal and as determined by the provision of a first control signal followed by another output signal upon the termination of said input signal and in response to a second control signal, including first voltage storage means which stores a voltage signal in response to the occurrence of said input signal, first circuit control means responsive to said first control signal to become conductive and connected to said first voltage storage means to discharge said voltage signal and thereby to provide said one output signal when the first control signal is provided, second voltage storage means responsive to said one output signal, and second circuit control means responsive to said second control signal to become conductive and connected to said second voltage storage means to provide said another output signal after the discharge of said voltage signal and when the second control signal is provided.

3. Apparatus for interrupting the programmed operation of a computer upon the occurrence of an input signal and controlled by a probe pulse and an interrogation pulse including signal storage means responsive to said input signal to store a predetermined voltage signal, first circuit control means responsive to said probe pulse to control the provision of a first output signal by said signal storage means when said predetermined voltage signal is stored and the probe pulse is provided, second circuit control means connected to said signal storage means to provide a second output signal when said voltage signal is no longer stored and the interrogation pulse is provided, and a memory device connected between the computer and said signal storage means and having a first state of operation in response to the first output signal and a second state of operation in response to the second output signal.

4. Apparatus for sensing the presence of an input signal, including first signal storage means responsive to the presence of said input signal and second signal storage means, with said first signal storage member being operative in response to said input signal to store voltage energy from said input signal, a first switch member operatively connected between said first and second signal storage means, a first control signal source coupled to the first switch member to cause the second signal storage means to provide a first output signal and to store a predetermined voltage in response to said voltage energy from said first signal storage means, a second switch member responsive to said voltage energy stored by said first signal storage means and operatively connected to discharge said second signal storage means, and a second control signal source coupled to the second switch member to cause said second signal storage means after the discharge of said first signal storage means to provide a second output signal in accordance with said predetermined voltage stored by said second signal storage capacitor.

5. Apparatus for sensing the presence of an input signal, including signal storage means for receiving a storage signal responsive to said input signal, first switch means connected to said signal storage means, first control signal means connected to the first switch means and said signal storage means to provide a first output voltage signal in response to the presence of said storage signal, second switch means connected to said signal storage means, and second control signal means connected to the second switch means and said signal storage means to provide a second output signal in the absence of said storage signal stored by said signal storage means.

6. Apparatus for providing a first output signal and then a second output signal in response to the occurrence of an input signal, including first and second signal storage means, a first switch member connected to at least said first signal storage means, first control signal means connected to the first switch member to cause said first signal storage means to provide said first output signal and to charge said second signal storage means in response to the occurrence of said input signal, a second switch member connected to said second signal storage means, and second control signal means responsive to the termination of said input signal and connected to the second switch member to cause the second signal storage means to provide said second output signal after the provision of said first output signal.

References Cited
UNITED STATES PATENTS
3,134,966   5/1964   Wagner ------------ 340—174

BERNARD KONICK, *Primary Examiner.*

S. M. URYNOWICZ, *Assistant Examiner.*